United States Patent
Dottling et al.

(10) Patent No.: US 8,995,267 B2
(45) Date of Patent: Mar. 31, 2015

(54) HANDLING OF OVERLOADS AND HANDOVERS IN A COMMUNICATIONS NETWORK

(75) Inventors: Martin Dottling, Neubiberg (DE); Michael Faerber, Wolfratshausen (DE); Jaroslaw Lachowski, Nowy Sacz (PL); Andreas Lobinger, Grafing (DE); Juergen Michel, Munich (DE); Richard Waldhauser, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 110 days.

(21) Appl. No.: 13/127,501

(22) PCT Filed: Nov. 4, 2008

(86) PCT No.: PCT/EP2008/064923
§ 371 (c)(1),
(2), (4) Date: Jul. 29, 2011

(87) PCT Pub. No.: WO2010/051830
PCT Pub. Date: May 14, 2010

(65) Prior Publication Data
US 2011/0292799 A1   Dec. 1, 2011

(51) Int. Cl.
*H04W 28/02*   (2009.01)
*H04L 12/801*   (2013.01)
*H04W 36/22*   (2009.01)
*H04W 36/04*   (2009.01)
*H04W 84/04*   (2009.01)

(52) U.S. Cl.
CPC .............. *H04L 47/10* (2013.01); *H04L 47/12* (2013.01); *H04W 36/22* (2013.01); *H04W 36/04* (2013.01); *H04W 84/047* (2013.01)
USPC .......................................................... 370/235

(58) Field of Classification Search
None
See application file for complete search history.

(56) References Cited

U.S. PATENT DOCUMENTS

| | | | |
|---|---|---|---|
| 6,178,172 B1 | 1/2001 | Rochberger | 370/395 |
| 6,212,188 B1 | 4/2001 | Rochberger et al. | |
| 2007/0121673 A1 | 5/2007 | Hammer | 370/468 |
| 2008/0051096 A1* | 2/2008 | Rao | 455/449 |
| 2010/0195635 A1* | 8/2010 | Maeda | 370/338 |
| 2011/0058480 A1* | 3/2011 | Dahlen | 370/237 |

FOREIGN PATENT DOCUMENTS

CN   101257223 A   9/2008

* cited by examiner

Primary Examiner — Huy D Vu
Assistant Examiner — Teisha D Hall
(74) Attorney, Agent, or Firm — Harrington & Smith

(57) ABSTRACT

The present invention refers to handling of an overload in a communications network and to handling of handovers occurring after the handling of handovers in the communications net work, wherein said communications network is based upon a tree topology providing several levels of nodes in said communications network. According to the present invention, in formation about an overload is provided through several levels of nodes in communications network, starting from the node, with regard to which said overload has occurred, and ending with nodes being located in levels arranged upside the level, in which the overload occurred, and being connected directly or indirectly with the node, with regard to which said overload has occurred. When handling a handover from a cell in a node, which is affected by the overload, the handover will be allowed only if the cell comprises at least one node, which is also affected by the overload.

13 Claims, 4 Drawing Sheets

HANDLING OF OVERLOADS AND HANDOVERS IN A COMMUNICATIONS NETWORK

FIELD OF THE INVENTION

The present invention relates to handling of overloads and handovers in a communications network, wherein the communications network is based on a tree topology providing several levels of nodes in the communications network. In particular, the present invention relates to a method for handling of an overload in the communications network, to a method for handling of a handover in the communications network, to a network node, to corresponding computer program products, to data carriers comprising the computer program products, and to an information unit being configured to transmission or providing of information about an overload in the communications network.

BACKGROUND OF THE INVENTION

In communications networks, in particular, in telecommunications networks handling of overloads and handovers is a challenging task.

Document U.S. Pat. No. 6,178,172 B1 describes a method for performing topology database synchronization in an ATM network between two nodes wherein one of the nodes is in an overload state. Database synchronization is used in ATM networks for distributing link state parameters to all topology databases in a peer group. Database synchronization ensures that the members of the peer group maintain an identical view of the group. Overload information is only evaluated locally within nodes of the same peer group and does not cross hierarchy levels in the network.

Some of known communications systems provide a transport overload indicator and a radio resource overload indicator for handling of overloads. In the known systems, the radio resource overload indicator is a cell specific indicator as the entire radio resource is reused in each cell. The transport overload indicator, in turn, is a site specific indicator, which is set when the sum of the traffic received from all cells concerning a site indicates an overload situation. The radio resource overload indicator being set in a cell omits any handover to this cell from any other cell. The radio resource overload indicator, in turn, has no means for differentiating of the cause of the overload occurred in the network. This, however, causes wrong, false, or deficient handling of handovers.

Further, the known methodologies for handling of overloads and handovers still require too much load and/or act too slow with regard to the overload situation occurred in the communications network.

Thus, there is still a need for improving handling of overloads in communications networks. Furthermore, also handling of handovers after an overload has occurred is still an issue for improvements.

SUMMARY OF THE INVENTION

Object of the present invention is providing of an improved handling of overloads and handovers in a communications network.

This object is achieved by a method for handling of an overload in a communications network comprising features according to the claims, a method for handling of a handover in a communications network comprising features according to the claims, a node comprising features according to the claims, a computer program product comprising features according to the claims, a data carrier comprising features according to the claims, a computer program product comprising features according to the claims, a data carrier comprising features according to the claims, and/or an information unit comprising features according the claims.

Further embodiments of the present invention are provided with the corresponding dependent claims.

The object of the present invention is achieved by a method for handling of an overload in a communications network, wherein said communications network is based upon a tree topology providing several levels of nodes in said communications network, said method comprising:

providing of information about said overload by a node of a level of said communications network to a set of lower nodes, if an overload node, said overload node being a node with regard to which said overload has occurred, is said node or a node of an upper level of said communications network, said node of said upper level being connected to said node and said upper level being arranged upside said level in said communications network;

wherein each lower node comprised in said set of lower nodes is connected to said node and is a node of a lower level being arranged below said level in said communications network.

Thus, the present invention enables a more accurate announcing of an overload in a communications network, wherein only nodes, for working and handling of which the overload can become relevant, are provided with the information about the overload. Thus an announcing of an overload with a refined granularity is enabled by the present invention. Further, an resource saving handling of the overload is enabled by the present invention, as only nodes, for working and handling of which the overload can become relevant, are provided with the information about the overload.

According to an embodiment of the present invention:

said node of said upper level is connected to said node directly or through at least one further node being located in at least one level arranged between said upper level and said level in said communications network; and each lower node comprised in said set of lower nodes is connected to said node directly or through at least one further node being located in at least one level arranged between said level and a level of the lower node in said communications network.

Thus, the present invention enables a fast distribution of the information about the overhead along the levels being arranged below the level of the overload node, wherein only such lower nodes receive the information, which have a direct or an indirect connection to the overload node. Here, the term "indirect connection" means that the connection is provided through a chain of connected nodes of several levels of the communications network, i.e., through several levels of the communications network.

According to an embodiment of the present invention, said providing comprises a providing of information about level of said overload node to said set of lower nodes. Thus, each node underlying the overload node in the tree topology of the communications network becomes aware in a fast and effective way of the level of the communications network, in which the overload has occurred, and of range of effects of the overload.

According to an embodiment of the present invention, said providing comprises a providing of a list of lower overload nodes to said set of lower nodes, wherein each lower overload node of said list of lower overload nodes is connected to said overload node and is provided in a lower overload level arranged below level of said overload node in said communications network. Thus, each node underlying the overload node in the tree topology of the communications network becomes aware in a fast and effective way of further nodes in the communications network, which can be actually affected by the overload, and of range of effects of the overload. Furthermore, by use of knowledge about the nodes, which can be affected by the overload in the overload node, also information about cells affected by the overload can be derived.

With regard to this embodiment of the present invention, each lower overload node of said list of lower overload nodes can be connected to said overload node directly or through at least one further node being located in at least one further level arranged between level of said overload node and said lower overload level in said communications network. Thus, also here, the present invention enables a fast distribution of extensive information about the overload.

According to an embodiment of the present invention, said providing comprises a providing of a list of cells to said set of lower nodes, wherein each cell of said list of cells comprises at least one node, which is connected to said overload node and which is provided in a level arranged below said overload level in said communications network. Thus, also here, each node underlying the overload node in the tree topology of the communications network receives in fast and effective way comprehensive information about the effects of the overload.

With regard to the present embodiment, said at least one node can be connected to said overload node directly or through at least one further node being located in at least one level arranged between said upper level and level of said overload node in said communications network. In this way, also here, a fast distribution of extensive information about the overload is enabled by the present invention.

The object of the present invention is achieved also by a method for handling of a handover in a communications network, wherein said communications network is based upon a tree topology providing several levels of nodes in said communications network, said method comprising:
if a node of a level of said communications network is an overload node, said overload node being a node with regard to which an overload has occurred, or if said overload node is a node of an upper level, said node of said upper level being connected (directly or indirectly) to said node and said upper level being arranged upside said level in said communications network, an accepting of a handover in said node from a cell when:
said overload in said communications network has been handled by use of a method according to claim 1; and
said cell comprises at least one node in said communications network; which is connected (directly or indirectly) to said overload node (directly or indirectly) and which is located in a level being arranged below level of said overload node in said communications network.

In this way the present invention enables a correct handling of handovers in all levels of the tree topology of a communications network after appearance of a handover. In particular, by use of the provided information about an overload, the nodes of lower levels in the network get a comprehensive view of the overload situation in general. This view corresponds to the view of a node of an upper level in the network. This knowledge enables the lower nodes (being located in levels of the network, which are arranged below the overload node level) to handle handover situations correctly and autonomous or independently.

Here, the lower nodes can use the knowledge about the level of the overload, the list of cells and/or the list of nodes mentioned above for dealing with a handover. The handover will be allowed only with regard to such cells, which also are influenced by the overload. Due to the overload situation, a handover from other cells will not be permitted.

The object of the present invention is achieved also by a method for operating a communications network, in particular, for handling overloads and handovers in a communications network, wherein said communications network is based upon a tree topology providing several levels of nodes in said communications network, said method comprising steps provided by the method for handling overloads and by the method for handling handovers, both as sketched above and described bellow in more detail.

Further, the object of the present invention is achieved by a system for operating of a communications network, in particular, for handling of overloads and handovers in said communications network, wherein said communications network is based upon a tree topology providing several levels of nodes in said communications network, said system comprising at least one of following:
an overload module, said overload module being configured to handle overloads in said communications network according to the method for handling overloads as sketched above and described below in more detail; and
an handover module, said handover module being configured to handle handovers in said communications network according to the method for handling handovers as sketched above and described below in more detail.

Furthermore, the object of the present invention is achieved by a network node configured for operation in a communications network, wherein said communications network is based upon a tree topology providing several levels of nodes in said communications network, said network node being configured for operating in a level of said communications network and comprising at least one of following:
a providing module, said providing module being configured to provide information about an overload-occurred in said communications network to a set of lower nodes, wherein each lower node comprised in said set of lower nodes is connected (directly or indirectly) to said network node and is a node of a lower level being arranged below said level in said communications network, if an overload node, said overload node being a node with regard to which said overload has occurred, is said network node or a node of an upper level, said node of said upper level being connected (directly or indirectly) to said network node and said upper level being arranged upside said level in said communications network, wherein each lower node comprised in said set of lower nodes is connected (directly or indirectly) to said network node and is a node of a lower level being arranged below said level in said communications network; and
a receiving module, said receiving module being configured to receive said information about said overload.

According to an embodiment of the present invention, said network node comprises:
an accepting module being configured to accept a handover in said network node from a cell, wherein if said overload has occurred in said communications network, and if said providing module has provided said information about said overload and/or said receiving module has received said information about said overload, said accepting module is configured to accept said handover when said cell comprises at least one node in said communications network, which is connected to said overload node (directly or indirectly) and which is located in a level being arranged below level of said current overload node in said communications network.

The object of the present invention is achieved also by a computer program product comprising a code, the code being configured to implement (perform) the method for handling overloads in a communications network as sketched above and described in more detail below.

According to an embodiment of the present invention, the code is embodied on a data carrier.

According to a further embodiment of the present invention, the computer program product is configured to perform the method for handling overloads in a communications network when the computer program product is executed by a processing unit like a processor, for example.

Further, the object of the present invention is achieved by a data carrier comprising the computer program product as sketched above.

Furthermore, the object of the present invention is achieved by a computer program product comprising a code, the code being configured to implement (perform) the method for handling handovers in a communications network as sketched above and described in more detail below. According to an embodiment of the present invention, the code is embodied on a data carrier. According to a further embodiment of the present invention, the computer program product is configured to perform the method for handling handovers in a communications network when the computer program product is executed by a processing unit like a processor, for example.

Additionally, the object of the present invention is achieved by a data carrier comprising said computer program product comprising a code for implementing (performing) of the method for handling handovers in a communications network.

The object of the present invention is achieved by an information unit, said information unit being configured for transmission or providing of information about an overload in a communications network, wherein:
  said communications network is based upon a tree topology providing several levels of nodes in said communications network;
  said information unit is configured to provide said information about said overload from a node of a level of said communications network to a set of lower nodes, if an overload node, being a node with regard to which said overload has occurred, is said node or a node of an upper level, said node of said upper level being connected (directly or indirectly) to said node and said upper level being arranged upside said level in said communications network, wherein each lower node comprised in said set of lower nodes is connected (directly or indirectly) to said node and is a node of a lower level being arranged below said level in said communications network; and
  said information unit comprises at least one of following:
    information about level of said overload node to said set of lower nodes;
    a list of lower overload nodes, wherein each lower overload node of said list of lower overload nodes is connected (directly or indirectly) to said overload node and is provided in a lower overload level arranged below level of said overload node in said communications network; and
    a list of cells, wherein each cell of said list of cells comprises at least one node, which is connected (directly or indirectly) to said overload node and which is provided in a level arranged below said overload level in said communications network.

According to the present invention, load information is provided for links cascaded in a tree topology such that nodes at each level of the cascade can judge resource shortages in the upper layers of the network and the impact of own decision on the corresponding situation. Thus, knowledge of the layer causing an overload and of set of cells sharing the same congested, overloaded node is provided to each cell according to the present invention.

In this way, the present invention provides an effective, more accurate, and fast distribution of information concerning overload situations in a communications network, wherein extensive information about an overload is provided to nodes affected by the overload in a load saving way. Furthermore, a correct handling of handovers after occurring of an overload, in particular, with regard to nodes affected by the overload is enabled by use of the present invention.

BRIEF DESCRIPTION OF THE DRAWINGS

The present invention will be more clearly understood from the following description of the preferred embodiments of the invention read in conjunction with the attached drawings, in which.

DESCRIPTION OF THE PREFERRED EMBODIMENTS

Figure 1:
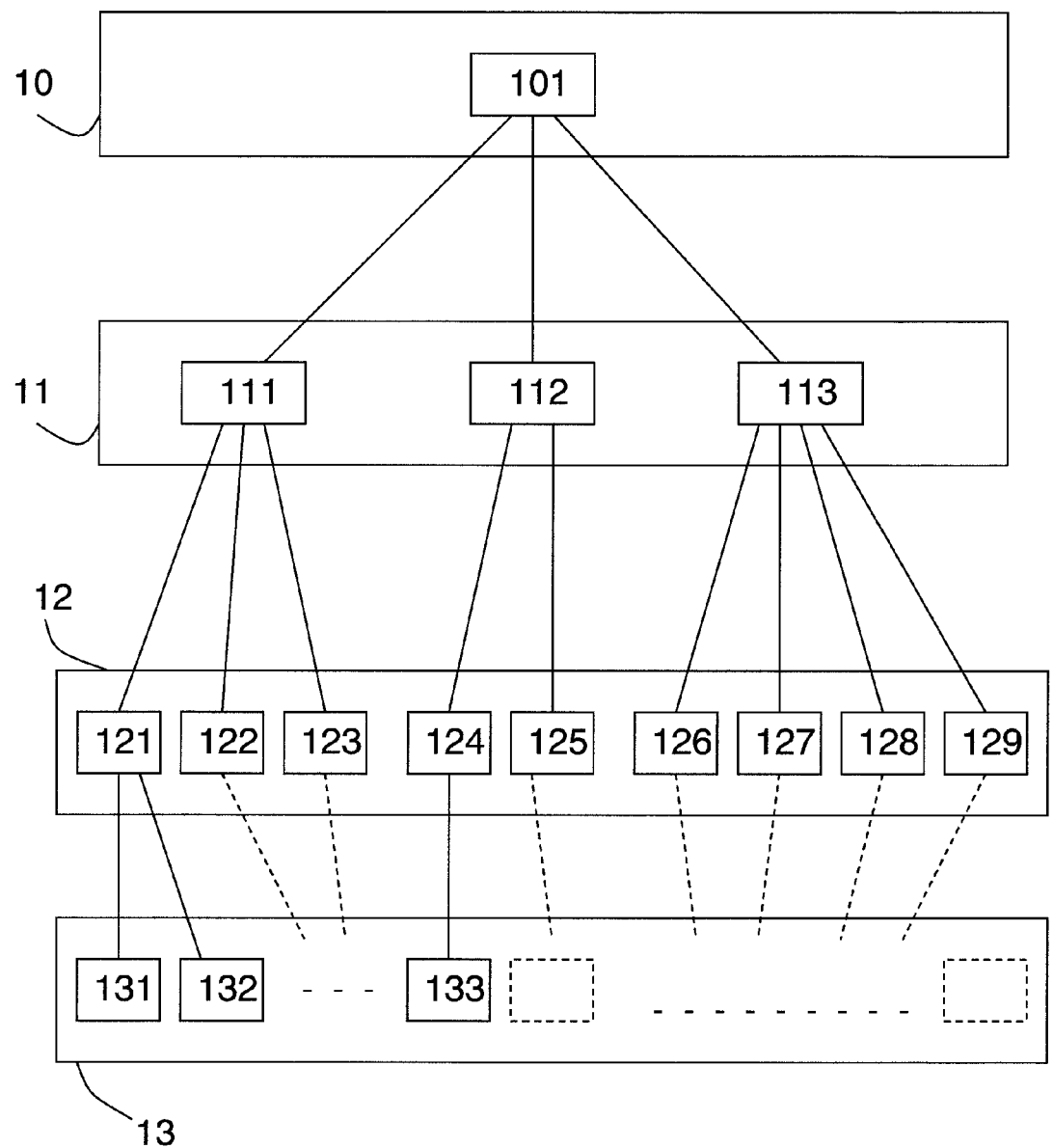
FIG. 1 presents a communications network, in which handling of overloads and handovers in a communications network is performed according to an embodiment of the present invention.

FIG. 1 shows a communications network, in which handling of overloads and handovers in a communications network is performed according to an embodiment of the present invention.

The communications network is based on a tree topology. Such communications networks are can be provided also as hierarchical networks. A tree topology in general has a central 'root' node (at top level of the hierarchy), which is connected to one or more other nodes that are one level lower in the hierarchy (i.e., the second level), while each of the lower level nodes being connected to the 'root' node can also have one or more other nodes, which are located one level lower in the tree hierarchy of the communications network (i.e., the third level) and which are connected to the corresponding lower level node. The same applies also to the nodes being located in the next lower level and so on.

In FIG. 1, four levels 10, 11, 12, 13 of nodes 101, 111, 112, 113, 121, 122, 123, 124, 125, 126, 127, 128, 129, 131, 132, 133 of a communications network based on tree topology are provided exemplary.

According to the present embodiment, a gateway node 101 is provided as a 'root' node in the top level of the communications network. The gateway node 101 is connected to base stations or Nodes B 111, 112, 113 in a next lower level 11. The base station or Node B 111 provides transport capacity and wireless backhaul for relay nodes 121, 122, 123 in a next lower level 12 and serves a set of cells 'A' directly. The base station or Node B 112 provides transport capacity and wireless backhaul for relay nodes 124, 125 in the lower level 12 and serves a set of cells 'B' directly. The base station or Node B 113 provides transport capacity and wireless backhaul for relay nodes 126, 127, 128, 129 in the lower level 12 and serves a set of cells 'C' directly.

Further, each of the relay nodes 121, 122, 123, 124, 125, 126, 127, 128, 129 of level 12 can be connected to several user equipment nodes. In FIG. 1, for sake of simplicity, just some of such connections are shown, wherein the relay node 121 is connected to user equipments 131, 132, and the relay node 124 is connected to user equipment 133.

In following, the present invention will be explained exemplary in more detail with regard to mobile wireless communications, such as 3GPP Long-Term Evolution (LTE) or LTE-Advanced (LTE-A), for example, and with regard to system behaviour in communications networks with relay nodes supporting automated configuration (SON). However, it has to be noted, that the present invention is not restricted to this embodiment only. The present invention can be applied to several kinds of mobile communications networks based on a tree topology.

According to the present embodiment, the relay nodes 121, 122, 123, 124, 125, 126, 127, 128, 129 use a self backhaul concept, i.e., for each of the relay nodes a part of the spectrum is reused for a backhaul between the relay node and the user equipment node connected to the relay node, wherein another part of the spectrum is used for traffic between multiple user equipment nodes and base stations or Nodes B.

First, a situation is considered, in which the gateway node 101 is in overload. Then, the gateway node 101 provides information about the overload to base stations 111, 112, 113, it is connected to. The base stations 111, 112, 113, in turn, inform the corresponding relay nodes 121, 122, 123, 124, 125, 126, 127, 128, 129 about the overload. Here, as overload information the statement "Overload at level 10" can be provided in an overload message transmitted from the top level 10 to the lower levels 11, 12 in the communications network. Further, a cell list comprising the following network elements can be transmitted: {'A', 'B', 'C', 121, 122, 123, 124, 125, 126, 127, 128, 129}. The cell list can be sent with the overload message or separately (therefore less frequently).

In a further situation, the base station or Node B 112 is in overload, e.g., due to limitations of a transport link between the base station or Node B 112 and the gateway node 101 or due to processing limitations.

Then, the base station or Node B 112 transmits or sends an overload message or information to relay nodes 124, 125 connected to the base station or Node B 112 in the next lower level 12, said overload message or information comprising: "Overload at level 11".

Here, the relay nodes 124, 125 will know the local (i.e. the base station or Node B 112 specific) level 11 cell list: {124, 125}. Also here, the list can be sent with the overload message or separately.

Thus, according to the present embodiment, the relay node 124 will accept only such handovers, which come from the cell of the relay node 125 and vice versa. Handovers from other cells comprising only nodes not connected to the base station or Node B 112 will not be considered by the relay nodes 124, 125.

At the same time, the base station or Node B 112 might provide the same information to neighbour base stations or Nodes B 111, 113 located in the same level 11 as the overload node, the base station or Node B 112, in order to prevent handover to all cells contained in the cell list of the overload node, the base station or Node B 112 ({124, 125}).

According to a third situation considered exemplary with regard to the present embodiment, a feeder link from the base station or Node B 112 to the relay node 124 is in overload. Here, the overload node being the base station or Node B 112 sends an overload message or information to relay nodes 124, 125, said overload message or information comprising an information about the overload level, e.g., "Overload at level 12", and a list of the overloaded feeder links, in the present case: {124}.

Systems like LTE and LTE-A, for example, exploiting relay nodes using the self backhaul concept operating frequency bands are selected on the demanded and available bandwidths. System concepts like LTE and LTE-A, for example, introduce the capability of high data rate wireless communication. To achieve the high data rate, high performance operation, large bandwidths are needed, e.g., 20 MHz for LTE. LTE-A considers even more the concatenation of several bands, which probably requires the operation in even higher frequency bands. Such constraints limit the achievable range of the cell in conventional systems, thus, increasing the number of cells needed.

The present invention as shown exemplary in the present embodiment provides a cost efficient solution by utilization of relay nodes, which allows installations without having terrestrial broadband access or the need to install a micro wave link.

Further, a refined granularity with regard to handling of overloads is enabled according to the present invention, in particular as explained by use of the present embodiment, where sharing of spectrum is also an important issue. The radio resource overload indicator of state of art as explained above has no means to differentiate the cause of the overload coming from the backhaul of relay node to base station node connection or the number of connections between several user equipments and the base station or Node B.

The present invention, in particular, as shown exemplary in the present embodiment introduces an extended overload indicator, which indicates that the combination of backhaul resources needed and radio resources for connections between user equipments and a base station or Node B is in overload.

The setting of this indicator allows handovers between relay nodes embedded in the same base station or Node B cell and omits handovers from relay nodes, which are situated in adjacent cells. In this way, transport bottleneck situations can be indicated, which are caused backhaul capacity actually allocated in a cell. Handover decisions can be made in a state of better information of the system, a handover from a relay node to another relay node within the same cell and to the master base station or Node B is still allowed, whereas the handovers coming from other cells are rejected. Without distinction or considering of information, where the bottleneck in the communications network is arisen, as it is the case in state of art, the relay node either rejects or accepts all handovers.

According to the present invention, in particular, according to the present embodiment, e.g., in a relay enhanced cell the overload information provides information to the relay node, whether the overload occurs in the individual feeder link (and only the individual relay node is affected) or in the backhaul of the base station or Node B. In the latter case, a list of relay nodes attached to the same base station or Node B is provided and the relay node can differentiate resource requests accordingly, e.g., accepting still handovers from relay nodes attached to the same base station or Node B, as they do not change backhaul load, but refusing handovers from other relay nodes and/or base stations or Nodes B.

In the present embodiment, the base station or Node B 111, 112, 113 will deliver a wireless backhaul overload indicator to all relay nodes 121, 122, 123, 124, 125, 126, 127, 128, 129 allocated in the cell of the base station or Node B 111, 112, 113.

Additionally, a list is distributed and periodically updated to all relay nodes 121, 122, 123, 124, 125, 126, 127, 128, 129 belonging to the same base station or Node B 111, 112, 113. Thus, the distributed information indicates, which other cells share the same backhaul.

Here, the list can be generalized to a list of cells, from which handovers will still be allowed. In this case, the dependent nodes (i.e., the relay nodes 121, 122, 123, 124, 125, 126, 127, 128, 129) will even not need to know the reason of the overload. Here, also other issues than transport bottlenecks can be sources for overloads, e.g., the base station or Node B could also prevent handovers between some of its own relays.

Thus, the present invention introduces a new category of handovers on top level from point of view of user equipments.

Figure 2A:
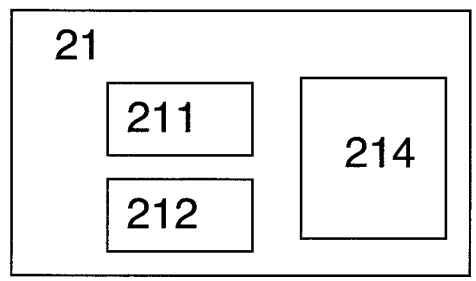
FIG. 2a presents a network node configured for operation in a communications network according to an embodiment of the present invention.
Figure 2B:
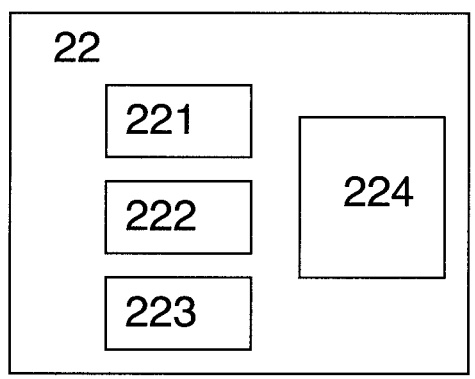
FIG. 2b presents a network node configured for operation in a communications network according to an embodiment of the present invention.
Figure 2C:
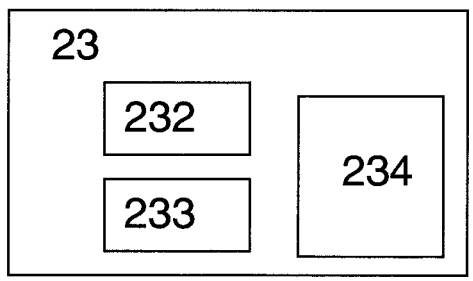
FIG. 2c presents a network node configured for operation in a communications network according to an embodiment of the present invention.

FIGS. 2a to 2c present exemplary arrangements of network nodes 21, 22, 23 configured for operation in a communications network, which is based upon a tree topology providing several levels of nodes, wherein each of said network nodes 21, 22, 23 is arranged for operating in a level of the communications network.

In FIG. 2a, a network node 21 according to an embodiment of the present invention is shown, which could be provided, e.g., on a top level of the tree topology of the communications network. Here, the network node 21 comprises a providing module 211 configured to provide information about an overload to nodes placed in lower levels in the communications network and connected directly or indirectly to the network node 21. As mentioned above, the information about the overload can comprise information about the level of the overload and/or a list of cells and/or of nodes affected by the overload.

According to the present embodiment, the node 21 comprises a storing module 214 configured for storing (at least temporary) the overload information, e.g., a list of cells and/ or of nodes affected by the overload.

Further, according to the present embodiment, the node comprises an accepting module 212 configured to accept handovers according to the present invention. Here, the accepting module 212 can use the list of cells and/or of nodes affected by the overload as stored in the storing module 214.

FIG. 2b presents a node 22 configured for operation in a communications network according to an embodiment of the present invention. The node 22 could be located, e.g., in an intermediate level of the tree topology of the communications network. The node 22 comprises a providing module 221, an accepting module 222, and a storing module 224, as explained above, in particular, with regard to corresponding modules of node 21 provided by FIG. 2a. The node 22 comprises further a receiving module 223, which is configured to receive the information about the overload. Further, the receiving module 223 can be configured to store this information at least temporary in the storing module 224.

FIG. 2c presents a node 23 configured for operation in a communications network according to an embodiment of the present invention. The node 23 could be located, e.g., in one of lower levels of the tree topology of the communications network. The node 23 comprises an accepting module 232, a receiving module 233, and a saving module 234, all modules configured as already described above, in particular, with regard to corresponding modules of nodes 21 and 22 provided in FIGS. 2a and 2b.

Figure 3:
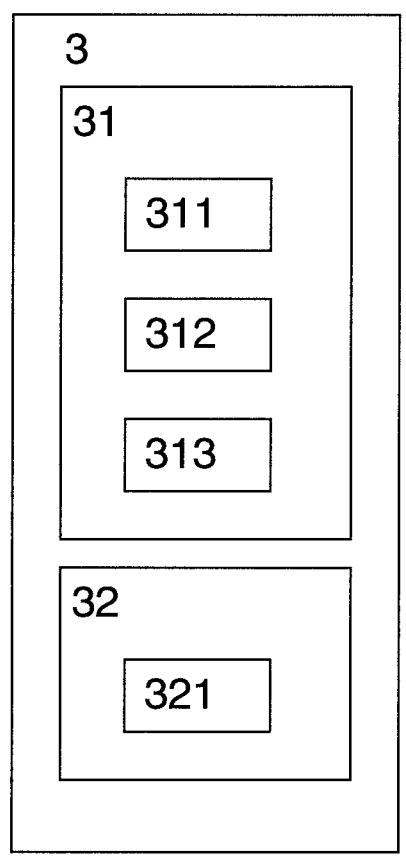
FIG. 3 presents a block diagram comprising steps required for handling of overloads and handovers according to an embodiment of the present invention.

FIG. 3 presents a block diagram comprising steps required for handling of overloads and handovers according to an embodiment of the present invention. Here, a method 3 for operating a communications network (at least with regard to handling of overloads and handovers) comprises a step 31 for handling of overloads in the communications network and a step 32 for handling of handovers in the communications network.

The handling of overloads provided as step 31 in FIG. 3 comprises recognizing 311 of an overload situation in a node of the communications network, wherein the recognizing 311 can comprise recognizing of the overload situation by the overload node itself (being node to which the overload is related directly), here the recognizing node will be the overload node, or receiving of overload information from a node of an upper level, which is overload node or a node being located in a level below the overload level in the communications network and being connected (directly or indirectly) to the overload node.

Further, the step 31 of handling of overloads in a communications network comprises providing 312 of information about the overload to further nodes in communications network, wherein the further nodes are located in levels arranged below the level of the node, which recognized the overload in the recognizing step 311, and are connected directly or indirectly to the recognizing node. Here, within the scope of the providing step 312, the recognizing node can be configured to send or transmit a corresponding overload message comprising the information about the overload to the further nodes.

Finally, the step 31 of handling of overloads in a communications network comprises a step for receiving 313 of the information about the overload by the further nodes in the communications network.

The handling of handovers provided as step 32 in FIG. 3 comprises accepting 321 of a handover from a cell by a node in the communications network. Wherein, if step 31 has already been performed with regard to an overload and if the node responsible for accepting of the handover is affected by the overload, the handover is accepted only if the cell comprises at least one node, which also is affected by said overload. Otherwise, the handover will be rejected by the node responsible for accepting of the handover.

Figure 4:
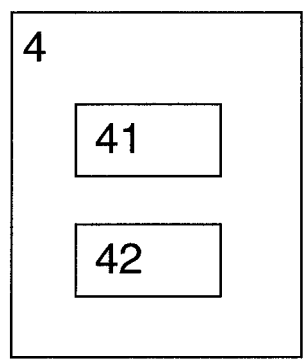
FIG. 4 presents an information unit configured for transmission of information about an overload in a communications network according to an embodiment of the present invention.

FIG. 4 presents an information unit 4 configured for transmission of information about an overload in a communications network according to an embodiment of the present invention.

Here, the information unit 4 comprises a data unit 41 comprising information about level of the overload node, i.e., information about the overload level. Further, the information unit 4 comprises a data unit 42 comprising a list with lower overload nodes being nodes provided below the overload node in the tree topology of the communications network and being connected directly or indirectly to the overload node and/or with cells, wherein each of the cells comprises at least one of the lower overload nodes.

Thus, the present invention refers to handling of an overload in a communications network and to handling of handovers occurring after the handling of handovers in the communications network, wherein said communications network is based upon a tree topology providing several levels of nodes in said communications network. According to the present invention, information about an overload is provided through several levels of nodes in communications network, starting from the node, with regard to which said overload has occurred, and ending with nodes being located in levels arranged upside the level, in which the overload occurred, and being connected directly or indirectly with the node, with regard to which said overload has occurred. When handling a handover from a cell in a node, which is affected by the overload, the handover will be allowed only if the cell comprises at least one node, which is also affected by the overload.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims. It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

Thus, several configurations of arrangements of information about an overload are possible. Further, the information about the overload can be provided in one message as one whole information part or in several messages, each comprising a reasonable part of the whole overload information. Moreover, also further information relevant for the overload situation can be transmitted. Furthermore, several arrangements of modules of network nodes enabling performing of handling of overload and/or handover according to the present invention are possible.

LIST OF REFERENCES 10 top level in a communications network
101 gateway node in a communications network
11 level in a communications network
111 base station node or Node B in a communications network
112 base station node or Node B in a communications network
113 base station node or Node B in a communications network
12 level in a communications network
121 relay node in a communications network
122 relay node in a communications network
123 relay node in a communications network
124 relay node in a communications network
125 relay node in a communications network
126 relay node in a communications network
127 relay node in a communications network
128 relay node in a communications network
129 relay node in a communications network
13 level in a communications network
131 user equipment in a communications network
132 user equipment in a communications network
133 user equipment in a communications network
21 a network node
211 providing module
212 accepting module
214 storing module
22 a network node
221 providing module
222 accepting module
223 receiving module
224 storing module
23 a network node
232 accepting module
233 receiving module
234 storing module
3 operating of a communications network
31 handling of overloads in a communications network
311 recognizing of an overload
312 providing of information about an overload
313 receiving of information about an overload
32 handling of handovers in a communications network
4 information unit
41 first data unit
42 second data unit

The invention claimed is:

1. A method for handling of an overload by network nodes in a communications network, wherein said communications network is based upon a tree topology providing several levels of nodes in said communications network, said method comprising:
    providing of information about said overload by a node of a level of said communications network to a set of network nodes of a lower level, if an overload node, said overload node being a node with regard to which said overload has occurred, is said network node or a network node of an upper level to which said network node is connected;
    wherein each network node comprised in said set of network nodes is connected to said network node;
    wherein network nodes of a first level and a second level arranged below the first level are connected if they are either connected directly or connected through at least one further network node being located in at least one level between the first level and the second level in the communications network, wherein
    said information comprises an indication of said overload node, and wherein said set of network nodes comprises a relay node wirelessly connected to a base station of a radio access network.

2. The method according to claim 1, wherein said providing comprises a providing of information about the level of said overload node to said set of network nodes.

3. The method according to claim 1, wherein said providing comprises a providing of a list of lower level overload nodes to said set of network nodes, wherein each lower level overload node of said list of lower level overload nodes is connected to said overload node and is provided in a lower overload level arranged below level of said overload node in said communications network.

4. The method according to claim 1, wherein said providing comprises a providing of a list of cells to said set of network nodes, wherein each cell of said list of cells comprises at least one network node, which is connected to said overload node and which is provided in a level arranged below said overload level in said communications network.

5. A network node configured for operation in a communications network, wherein said communications network is based upon a tree topology providing several levels of nodes in said communications network, said network node being configured for operating in a level of said communications network and comprising:
    a providing module, said providing module being configured to provide information about an overload occurred in said communications network to a set of network nodes of a lower level, if an overload node, said overload node being a node with regard to which said overload has occurred, is said network node or a node of an upper level to which said network node is connected, wherein each network node comprised in said set of nodes is connected to said network node;

wherein network nodes of a first level and a second level arranged below the first level are connected if they are either connected directly or connected through at least one further network node being located in at least one level between the first level and the second level in the communications network, wherein said information comprises an indication of said overload node; and wherein said set of network nodes comprises a relay node wirelessly connected to a base station of a radio access network.

6. The network node according to claim 5 further comprising an accepting module being configured to accept a handover in said network node from a cell, when the cell comprises at least one network node in said communications network which is connected to said overload node.

7. A non-transitory computer-readable medium that stores computer program instructions embodied in a communications network, wherein said communications network is based upon a tree topology providing several levels of nodes, where execution of the computer program instructions by at least one data processor results in execution of operations that comprise:

providing information about an overload by a node of a level of said communications network to a set of network nodes of a lower level, where if an overload node, said overload node being a node with regard to which said overload has occurred, and is said network node or a network node of an upper level to which said network node is connected;

wherein each network node comprised in said set of network nodes is connected to said network node;

wherein network nodes of a first level and a second level arranged below the first level are connected if they are either connected directly or connected through at least one further network node being located in at least one level between the first level and the second level in the communications network, wherein said information comprises an indication of said overload node; and wherein said set of network nodes comprises a relay node wirelessly connected to a base station of a radio access network.

8. The non-transitory computer-readable medium of claim 7, embodied on a data carrier.

9. The method according to claim 1, further comprising accepting of a handover in said network node from a cell when the cell comprises at least one network node in said communications network which is connected to said overload node.

10. The network node according to claim 5, further comprising a receiving module being configured to receive said information about said overload.

11. The method according to claim 1, wherein the radio access network is an evolved universal terrestrial radio access network.

12. The network node according to claim 5, wherein the radio access network is an evolved universal terrestrial radio access network.

13. The non-transitory computer-readable medium according to claim 7, wherein the radio access network is an evolved universal terrestrial radio access network.

* * * * *